United States Patent
Kaindl

(10) Patent No.: US 6,539,222 B1
(45) Date of Patent: Mar. 25, 2003

(54) METHOD AND APPARATUS FOR DETERMINING DISTURBED AND/OR OCCUPIED FREQUENCY CHANNELS IN A MOBILE COMMUNICATION SYSTEM

(75) Inventor: Rolf Kaindl, Freising (DE)

(73) Assignee: Willtek Communications GmbH, Ismaning (DE)

( * ) Notice: Subject to any disclaimer, the term of this patent is extended or adjusted under 35 U.S.C. 154(b) by 0 days.

(21) Appl. No.: 09/439,496

(22) Filed: Nov. 12, 1999

(30) Foreign Application Priority Data

Nov. 24, 1998 (DE) .......................... 198 54 177

(51) Int. Cl.[7] .......................... H04Q 7/20; H04B 17/00
(52) U.S. Cl. ....................... 455/425; 455/67.4
(58) Field of Search ................. 455/67.4, 67.1, 455/423, 425, 226.1, 226.4; 379/1.01, 27.01; 375/224

(56) References Cited

U.S. PATENT DOCUMENTS

| | | | |
|---|---|---|---|
| 5,201,063 A | * | 4/1993 | Tam et al. |
| 5,600,138 A | * | 2/1997 | Colson et al. ............ 250/330 |
| 5,909,642 A | * | 6/1999 | Suzuki ................ 375/297 |
| 6,118,982 A | * | 9/2000 | Ghisler et al. |

FOREIGN PATENT DOCUMENTS

DE     196 53 122 A1     12/1996

OTHER PUBLICATIONS

Schoblick, Robert, Measurement Technique for GSM Mobile Telephones, Funkschau, vol. 16, 1997, pp. 64–66 and English translation thereof.

* cited by examiner

Primary Examiner—Nguyen T. Vo

(57) ABSTRACT

The present invention relates to a method and a apparatus for determining disturbed and/or occupied frequency channels of a mobile communication net in which after registration of a mobile telephone onto a testing apparatus measurement report parameters between the mobile telephone and the testing apparatus in frequency channels to be probed are detected and evaluated. Further, a measurement report parameter is selected for the channels to be probed wherein the selected measurement report parameter is channelwise detected in the channels to be probed with a suitable RF level and compared to a threshold value, wherein the probed channel is recognized as disturbed and/or occupied when there is a significant difference of the measurement report parameter to the threshold value. Preferably, the measurement report parameters of disturbed and/or occupied frequency channels are displayed as a function of the probed channels.

25 Claims, 2 Drawing Sheets

METHOD AND APPARATUS FOR DETERMINING DISTURBED AND/OR OCCUPIED FREQUENCY CHANNELS IN A MOBILE COMMUNICATION SYSTEM

BACKGROUND OF THE INVENTION

The present invention relates to a method for determining disturbed and/or occupied frequency channels in a mobile communication system wherein after registration of a mobile telephone to a testing apparatus measurement report parameters between the mobile telephone and the testing apparatus in frequency channels to be probed are detected and evaluated. Further, the present invention relates to a testing apparatus, in particular for implementing the above method.

DESCRIPTION OF THE PRIOR ART

In order to check functions of mobile or cellular telephones for being in accordance with specifications necessary for operation in the net, it is known to test the mobile telephone using a testing apparatus. In single frequency channels of the net characteristic RF or HF parameters so called measurement report parameters of the mobile telephone are measured which can be used in order to find out whether the functions of the mobile telephone are in accordance with the specifications or whether a defect is present. Disturbed, distorted and/or occupied frequency channels which can temporarily be disturbed, distorted and/or occupied or disturbed, distorted and/or occupied during the entire measurement, externally impair the measured measurement report parameters of the mobile telephone and, therefore, can corrupt the measurement data. In this way the obtained data appear as if a defect is present although the mobile telephone is free of any malfunctions. Such measurement artifacts can be recognized and can be excluded from the measurement when in addition to the conventional testing apparatus spectrum analyzers are used for determining distorted and/or occupied frequency channels in the local communication net. However, the use of spectrum analyzers for measuring net properties has a plurality of drawbacks. In particular, it has to be noted that spectrum analyzers are quite expensive and complicated to use. Especially for small service and/or repair shops it is almost impossible to profit from the benefits of such a spectrum analyzer measurement.

OBJECTS OF THE INVENTION

It is an object of the present invention to avoid the drawbacks of the prior art and in particular to provide a method for determining disturbed and/or occupied frequency channels wherein in a cheap and easy way for a particular geographical point disturbed and/or occupied channels of the local communication net can be determined.

It is another object of the present invention to avoid corrupted measurement values when testing mobile or cellular phones without having the need to provide an expensive spectrum analyzer.

SUMMARY OF THE INVENTION

The above objects are solved by the invention, and more precisely by detecting a measurement report parameter in each channel in the frequency channels to be probed using a suitable high frequency level and by comparing it in a comparison procedure to a threshold value wherein the probed or measured channel is recognized as disturbed and/or occupied when there is a significant difference between the measurement report parameter compared to the threshold value.

In particular, a certain measurement report parameter of the mobile telephone is selected, the behavior of which relating to a preset threshold value in the respective probe channels provides hints or information regarding disturbances or interferences in the respective channels. The step of comparing the measurement report parameters to the threshold value (or interval) is thereby started anew in the respective frequency channels to be measured. In case a deviation or difference is present in the respective channels the corresponding channel in which a difference is detected and the corresponding value of the difference of the parameter is stored and thus available. By storing the parameter which is changed from a reference value characterizing an undisturbed state and by storing the corresponding frequency channels, disturbed and/or occupied channels are unambiguously determined without the need of using an additional spectrum analyzer. Thus, artifacts due to disturbed channels can be avoided when testing the functions of mobile or cellular telephones.

According to a user-friendly variation of the invention the detected channel(s) and/or the detected measurement report parameter(s) and/or its deviation(s), respectively, is stored when there is a significant deviation of the measurement report parameter compared to the threshold value in a certain channel. In this way, a reference and a further use of the information about the local communication net obtained by the method according to the invention is available.

Preferably, the stored measurement report parameters are displayed as a function of the respective probed channels so that using such a spectral distribution disturbed and/or occupied channels are visually detectable in an easy manner.

Preferably, a suitable measurement report parameter is selected for the channels to be probed or scanned. Such a measurement report parameter can, in particular for a certain frequency band, be preset or can be determined dependent on further criteria for a measurement.

According to a preferred embodiment of the method according to the invention as a threshold value the expectation value of the selected measurement report parameter in the respective frequency channels can be used inasmuch as the expectation value of such a parameter is an average value present in an operation without disturbances, such as interference, distortion, occupation.

According to another preferred variation a parameter is selected which comprises information about the bit error rate and is used as the measurement report parameter. In particular, for GSM/PCN/PCS nets (GSM: global system for mobile communication; PCN: personal communication network; PCS: personal communication system) the RXQUAL parameter is selected as a measurement report parameter comprising the information about the bit error rate. Thereby, a particularly sensitive method can be realized because there is a relatively precise correlation between the HF or RF level offered by the testing apparatus and the measurement report parameter RXQUAL retransmitted from the mobile telephone. The RXQUAL values show a significant deviation from the expectation value of an undisturbed channel even when interferences are low.

As an alternative, which also provides sufficient sensitivity as a measurement report parameter a parameter is selected which comprises information about the reception level. In GSM/PCS/PCN nets as a measurement report parameter the RXLEV parameter is selected, inasmuch as also in case of the RXLEV parameter there is a correlation between the RF level offered by the testing apparatus and the RXLEV value retransmitted from the mobile telephone.

It is noted that RXQUAL is an abbreviation and stands for Radio Link Quality/Received Signal Quality. Further, RXLEV is an abbreviation and stands for Received Signal Input Level. The RXQUAL parameter measures reception quality and the RXLEV parameter measures reception level. It is not known in the prior art to use these parameters to scan the local conditions of a communication net using a cellular phone and a tester therefor.

In particular, for sampling or probing temporary disturbances or interferences and in order to further increase the sensitivity of the method, the channels to be measured are sampled a plurality of times. Thereby, when sampling a plurality of times, the detected values of the selected measurement report parameter are added channelwise. In case of the RXQUAL parameter the added RXQUAL values per channel result in a relative measure of the field strength of the disturbance inasmuch as the numerical value of the RXQUAL parameter is increased with the level of the disturbance.

In case of stronger disturbances it is preferred in order not to lose the control over the process of switching channels to respectively set the high frequency level high when switching between the channels to be probed and lower when detecting the measurement report parameters in the channels to be measured. According to a particular preferred embodiment the detecting of a measurement report parameter is carried out with a low RF level of about −90 dBm. According to a particularly useful embodiment of the present invention the registration of the mobile is made in the lowest frequency channel of a frequency band. Therein, the channels of the frequency band are measured channelwise using a measurement loop.

According to another embodiment of the present invention the channels which have been recognized as disturbed or occupied are blocked. In this way automatically an erroneous measurement or check of the mobile telephone can be avoided. As an alternative or in addition thereto warning messages can be displayed comprising information about the charnels recognized as disturbed and/or occupied. This is in order to inforn the user of the testing apparatus that wrong measurements are probable with these channels.

According to another aspect of the present invention the above stated object is solved in that the testing apparatus comprises means for determining disturbed and/or occupied frequency channels of a mobile communication net.

Further, the invention provides means for comparing the respective detected measurement report parameters to a threshold value and means for storing and displaying the measurement report parameters detected in the probed channels. Further, the testing apparatus comprises means for adjusting the RF level wherein a RF level as high as possible can be adjusted for switching channels and wherein the RF level can respectively be lowered for a detection of a measurement report parameter. Further, the apparatus may comprise the means for setting all the channels.

Thus, according to the invention, disturbed and/or occupied channels can be detected and displayed without the need to use an additional spectrum analyzer. Corrupted measurements due to disturbed and/or occupied channels which result in measurement artifacts of measurement of one or more device functions of a mobile or cellular telephone can be avoided.

Further preferred embodiments of the invention are disclosed in the dependent claims.

BRIEF DESCRIPTION OF THE DRAWINGS

The invention and further developments and advantages thereof will be explained in the following with reference to an embodiment given by way of example and referring to the drawings which show.

DESCRIPTION OF PREFERRED EMBODIMENTS

Figure 1:
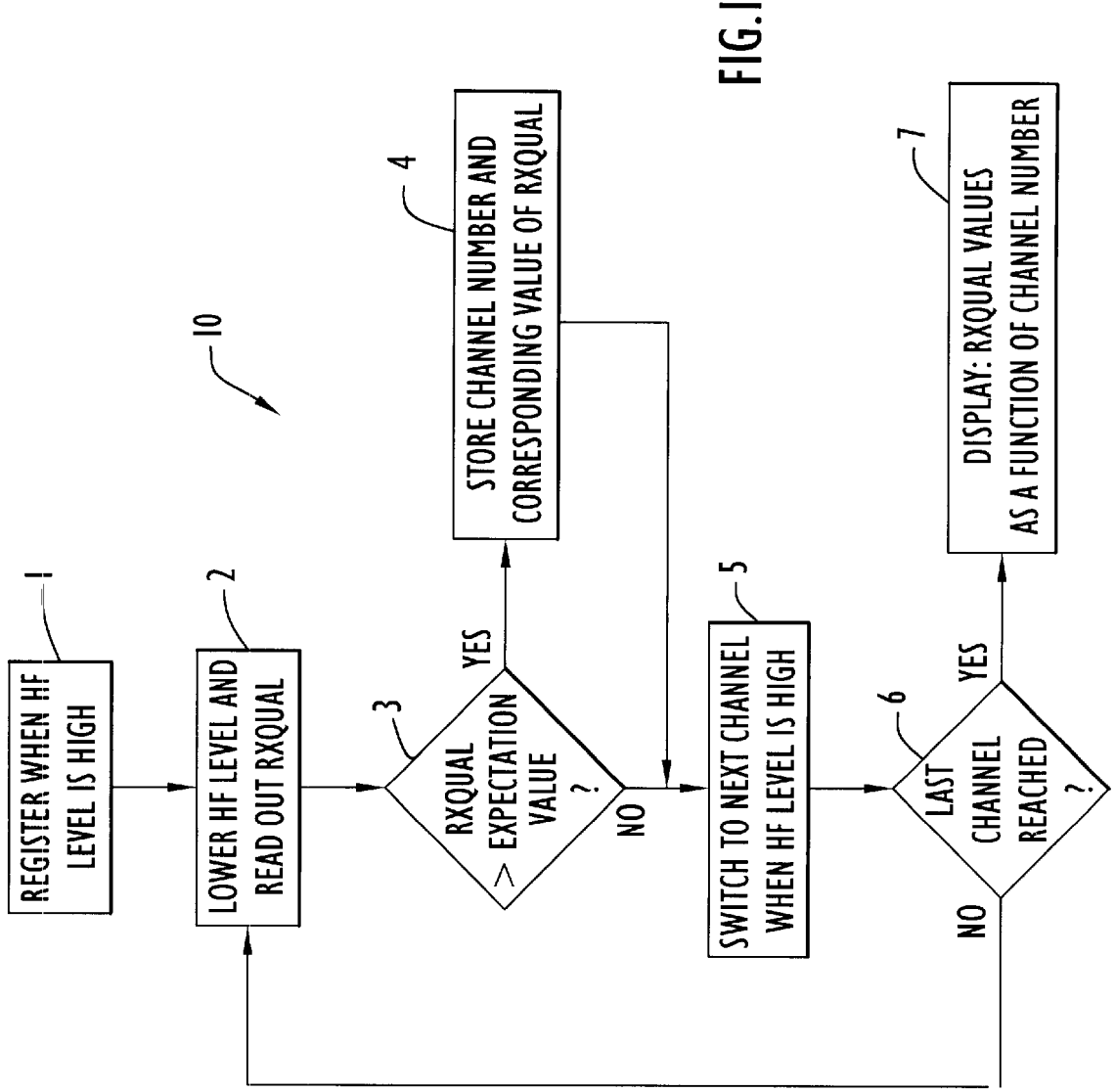
FIG. 1 a strongly schematic flowchart illustrating the steps carried out in a testing apparatus using the method according to the present invention.

Referring now to FIG. 1 a flow chart designated at reference numeral 10 illustrates the single steps of the method according to the invention for determining disturbed and/or occupied channels of a mobile communication net wherein the measurement method is implemented in the testing apparatus. According to the embodiment the measurement method and the testing apparatus refer to GSM/PCN/PCS mobile communication nets (GSM: global system for mobile communication; PCN: personal communication network; PCS: personal communication system).

In a first step 1, a mobile or cellular phone registers onto the testing apparatus according to the present invention at a high RF level in the lowest frequency channel n=1. After successful registration of the mobile telephone the RF level of the testing apparatus is lowered and the RXQUAL parameter value is read out in the channel in a second step 2.

According to the embodiment as a result of tests carried out by the inventor the RF level is lowered by the amount of −90 dBm; it is noted that dBm is defined as dB milliwatt=10 log 10×power {in 1 mW/1 mW}.

In a third step 3, a comparison of the detected RXQUAL parameter value to the expectation value is carried out, wherein as an expectation value the average value in an undisturbed operation is preset.

If the result of the comparison of step 3 is that a significant deviation of the detected parameter value in the channel from the given expectation value is present, then, in a storing step 4 the corresponding channel number and the corresponding RXQUAL parameter value is stored and the method switches to the next channel n+1. If the result of step 3 is that no deviation or difference is present in a step 5 the method switches to the next channel n+1 using a high RF level. After successful switching to the next channel in a step 6 it is determined whether the last channel to be probed has been reached. If the answer to this question is negative (in FIG. 1 indicated with "no") an internal pointer is set back to step 2 so that the process of the measurement method starts in this channel from step 2 onwards anew. However, if the answer to the question is affirmative and all channels of the band have been measured through, in a last step 7 the RXQUAL values stored in storing step 4 are displayed as a function of their channel numbers.

Figure 2:
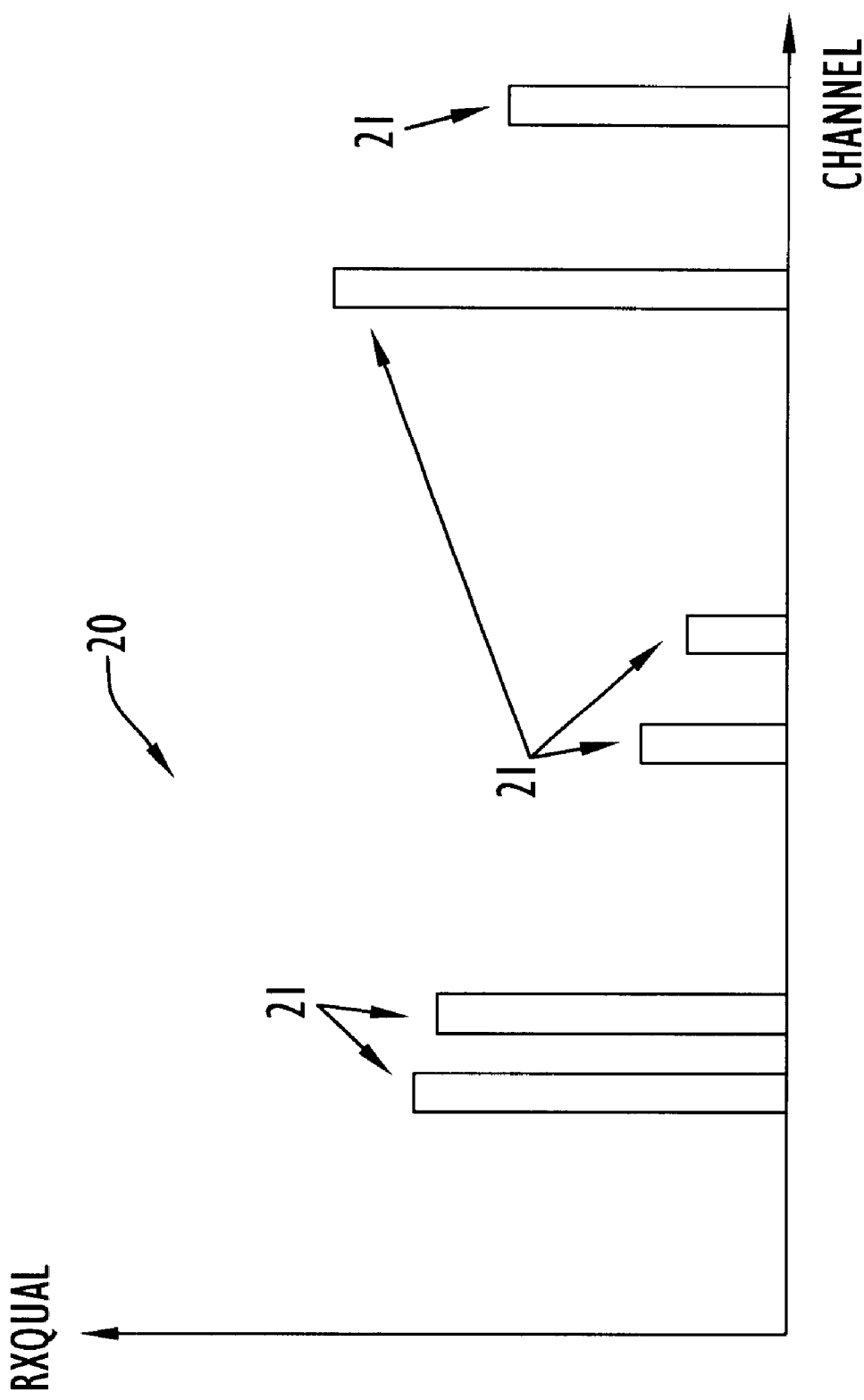
FIG. 2 a spectral distribution of measured values of the RXQUAL parameter in the single frequency channels, wherein the measured frequency channels are shown on the x-axis and the respective RXQUAL values on the y-axis.

FIG. 2 schematically illustrates in a graphic representation 20 the RXQUAL parameter values stored in step 7 as a function of the probed channels. Therein the horizontal zero value corresponds to the expectation value. The RXQUAL values 21 are higher as the intensity expected in normal operation, and therefore, relate to disturbed or occupied channels.

The testing apparatus comprises detection means for sampling RF measurement data, means for comparing the obtained measurement data to the respective expectation values in the single channels using a loop algorithm comprising the channels to be probed wherein the measurement loop starts from the lowest channel of a frequency band and proceeds to the last channels of the frequency band in a stepwise manner. Further, the testing apparatus according to the invention comprises means for storing and displaying the measurement data values being different from the expectation values. For an enhancement of the sensitivity, it is preferred to sample the single channels a plurality of times wherein the measurement data are added up channelwise. Further, the testing apparatus comprises signal generating means for transmitting protocol sequences.

A GSM/PCN/PCS mobile or cellular telephone is switched through the entire telecommunication band from channel n to channel n+1 by a mobile telephone testing apparatus after registration onto the testing apparatus and using channel assignment procedures. With low RF levels of about −90 dBm the respective so-called measurement reports of the mobile phone are evaluated. Measurement reports are the coded messages of the current reception conditions of the mobile telephone to the corresponding base station which in the present case corresponds to the mobile telephone testing device. There is a relatively precise connection between the RF level offered by the testing apparatus and the measurement reports RXLEV and RXQUAL retransmitted by the mobile telephone. Any deviation from the expected RXLEV measurement value is a hint for disturbances in the measured GSM channel. A local source of disturbances must have a very high level in order to provide a change of the RXLEV value which can be measured. A much more sensitive method is based on the evaluation of the RXQUAL values measured from the mobile telephone which are a hint for the current bit error rates. Even when only low interferences are present, these RXQUAL values show a significant deviation from the expectation of an undisturbed channel. The plot showing the RXQUAL values which are different from the expectation values versus the GSM channels reflects the local channel occupation and provide information about any other sources for disturbances within the GSM band. In addition thereto the RXQUAL values added per channel result in a relative measure of the field strength of the source of the disturbance inasmuch as the numerical value of the RXQUAL value is increased when the level of the disturbance is higher.

As speech channels in contrast to base stations might only temporarily be in operation it is advantageous to provide a longer observation or measurement time on the single channels or a repetition of the channel switching using the method according to the invention for a plurality of times. In order not to lose control of the channel switching when carrying out a measurement of a mobile telephone with strong disturbances present on a particular GSM channel this measurement is made with the RF level of the GSM testing apparatus which is as high as possible. A temporary lowering of the level in the order of about −90 dBm then results in a RXQUAL measurement report parameter the value of which provides information for the magnitude or level of the possible disturbances. Inasmuch as each GSM mobile telephone is able to hold to a connection for several seconds even when reception conditions are extremely bad, the RXQUAL message can also be read out under extreme conditions of disturbances. Then, when the channels shall be switched anew the maximum RF level of the GSM testing apparatus is used in order to enable the testing apparatus to have safe control of the mobile telephone. The stored RXQUAL values as a function of the measured channels can subsequently be outputted in a list. Alternatively they can be outputted in a graphical manner.

Without further analysis the foregoing will so fully disclose the gist of the present invention that others can readily adapt it for various applications with omitting features that, from the standpoint of prior art, fairly constitute essential characteristics of the generic or specific aspect of this invention and, therefore, such adaptations should and are intended to be comprehended within the meaning and range of equivalence of the following claims.

We claim:

1. Method for determining disturbed and/or occupied frequency channels of a mobile communication system in which, after registration of a mobile telephone to a testing apparatus, measurement report parameters between the mobile telephone and the testing apparatus in frequency channels to be probed are detected and evaluated, wherein the method comprises the steps of:

(a) detecting at a predetermined RF level a measurement report parameter in each channel of the channels to be probed;

(b) comparing the detected measurement report parameter to an expectation value; and (c) identifying a probed channel as disturbed and/or occupied when the measurement report parameter deviates by more than a predetermined amount from the expectation value.

2. Method according to claim 1, further comprising the step of:

(d) storing or displaying at least one of: an identification of the probed channel, the detected measurement report parameter, and a difference between the measurement report parameter and the expectation value if the difference is greater than the predetermined amount.

3. Method according to claim 2, further comprising the step of:

(e) selecting the measurement report parameter used in steps (a)–(c) from a plurality of measurement report parameters.

4. Method according to claim 3, wherein the expectation value used in step (b) for each of the frequency channels is an expectation value of the selected measurement report parameter in an undisturbed and unoccupied frequency channel.

5. Method according to claim 4, wherein the channels to be probed are sampled a plurality of times, wherein the detected values of the selected measurement report parameter are summed channelwise.

6. Method according to claim 4, wherein a parameter comprising information about a reception level is selected as the measurement report parameter.

7. The method according to claim 6, wherein the measurement report parameter is the Received Signal Input Level (RXLEV) parameter.

8. Method according to claim 4, wherein a parameter comprising information about a bit error rate is selected as the measurement report parameter.

9. The method according to claim 8, wherein the measurement report parameter is the Radio Link Quality/Received Signal Quality (RXQUAL) parameter.

10. Method according to claim 1, further comprising the step of:

(d) setting a high RF level for switching between the frequency channels to be probed;

wherein step (a) includes lowering the RF level to a preset lower level while detecting the measurement report parameter in the channels to be probed.

11. The method according to claim 10, wherein the preset lower level is minus 90 dBm.

12. Method according to claim 1, wherein the registration of the mobile telephone is carried out in the lowest frequency channel of a frequency band, wherein the channels of the frequency band are measured channelwise using a measurement loop in order to cover the entire frequency band.

13. Method according to claim 1, further comprising the step of:

(d) blocking channels which have been identified as disturbed and/or occupied.

14. Method according to claim 1, wherein steps (a)–(c) are performed using a mobile telephone and a mobile telephone testing apparatus.

15. A testing apparatus for testing mobile telephones for operation in a mobile communication net, wherein the mobile communication net is such that, after registration of a mobile telephone onto the testing apparatus, measurement report parameters between the mobile telephone and the testing apparatus in frequency channels to be probed are detected and evaluated, wherein the testing apparatus further comprises:

a detector configured to detect a measurement report parameter channelwise in the channels to be probed with a predetermined RF level; and means for comparing the detected measurement report parameter to an expectation value, wherein a probed channel is recognized as disturbed and/or occupied when the measurement report parameter deviates by more than a predetermined amount from the expectation value.

16. Testing apparatus according to claim 13, further comprising:

a storage device in which is stored at least one of: an identification of the probed channel, the detected measurement report parameter, and a difference between the measurement report parameter and the expectation value if the difference is greater than the predetermined amount.

17. Testing apparatus according to claim 16, further comprising:

a display on which the measurement report parameters stored in the storage device are displayed as a function of respective probed channels.

18. A method of identifying distorted, disturbed or occupied frequency channels in a mobile communication net using a mobile telephone testing apparatus in combination with a mobile telephone, comprising:

(a) measuring, in a mobile telephone, a parameter of a signal received from the mobile communication net on a selected frequency channel;

(b) transmitting a measurement report from the mobile telephone to the mobile telephone testing apparatus, the measurement report indicating a measurement of the parameter by the mobile telephone; and (c) evaluating the measurement report in the mobile telephone testing apparatus to determine whether the selected frequency channel of the mobile communication net is distorted, disturbed or occupied.

19. The method of claim 18, wherein the mobile telephone testing apparatus is configured to measure, in individual frequency channels of the mobile communication net, characteristic RF parameters of the mobile telephone.

20. The method of claim 18, further comprising:

(d) using information indicating whether frequency channels in the mobile communication net are distorted, disturbed or occupied to determine whether the mobile telephone is defective or malfunctioning.

21. A system for determining whether frequency channels in a mobile communication net are distorted, disturbed or occupied, comprising:

a mobile telephone configured to measure a parameter of a signal received from the mobile communication net on a selected frequency channel; and a mobile telephone testing apparatus configured to receive from said mobile telephone a measurement report indicative of the parameter of the signal measured by said mobile telephone, said mobile telephone testing apparatus evaluating the measurement report to determine whether the selected frequency channel of the mobile communication net is distorted, disturbed or occupied.

22. The system of claim 21, wherein said mobile telephone testing apparatus compares the parameter to an expectation value and identifies the selected frequency channel of the mobile communication net as distorted, disturbed or occupied in response to the parameter deviating by more than a predetermined amount from the expectation value.

23. The system of claim 21, wherein the mobile telephone testing apparatus identifies the selected frequency channel of the mobile communication net as distorted, disturbed or occupied in response to the parameter exceeding a threshold value.

24. The system of claim 21, wherein said mobile telephone registers with said mobile telephone testing apparatus prior to measuring the parameter of the signal received from the mobile communication net.

25. The system of claim 21, wherein said mobile telephone measures the parameter on a plurality of communication channels of the mobile communication net, and said mobile telephone testing apparatus evaluates whether each of the plurality of communication channels is distorted, disturbed or occupied.

* * * * *